C. W. DAVIS.
JUNCTION BOX.
APPLICATION FILED AUG. 27, 1910. RENEWED DEC. 17, 1912.

1,107,499.

Patented Aug. 18, 1914.
3 SHEETS—SHEET 1.

WITNESSES:

INVENTOR
Charles W. Davis
by Christy and Christy
Atty's

C. W. DAVIS.
JUNCTION BOX.
APPLICATION FILED AUG. 27, 1910. RENEWED DEC. 17, 1912.

1,107,499.

Patented Aug. 18, 1914.

3 SHEETS—SHEET 3.

WITNESSES:
J. Herbert Bradley
Theodore Duff

INVENTOR
Charley W. Davis
by Christy and Christy
Att'ys

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURGH, PENNSYLVANIA, A CORPORATION OF PENNSYLVANIA.

JUNCTION-BOX.

1,107,499.     Specification of Letters Patent.     Patented Aug. 18, 1914.

Application filed August 27, 1910, Serial No. 579,334. Renewed December 17, 1912. Serial No. 737,309.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Junction-Boxes, of which improvements the following is a specification.

My invention relates to improvements in junction boxes for electrical transmission cables, and the objects of my invention are simplicity of structure and facility of installation.

My invention is illustrated in the accompanying drawings which form part of this specification and in which—

Figure 1:
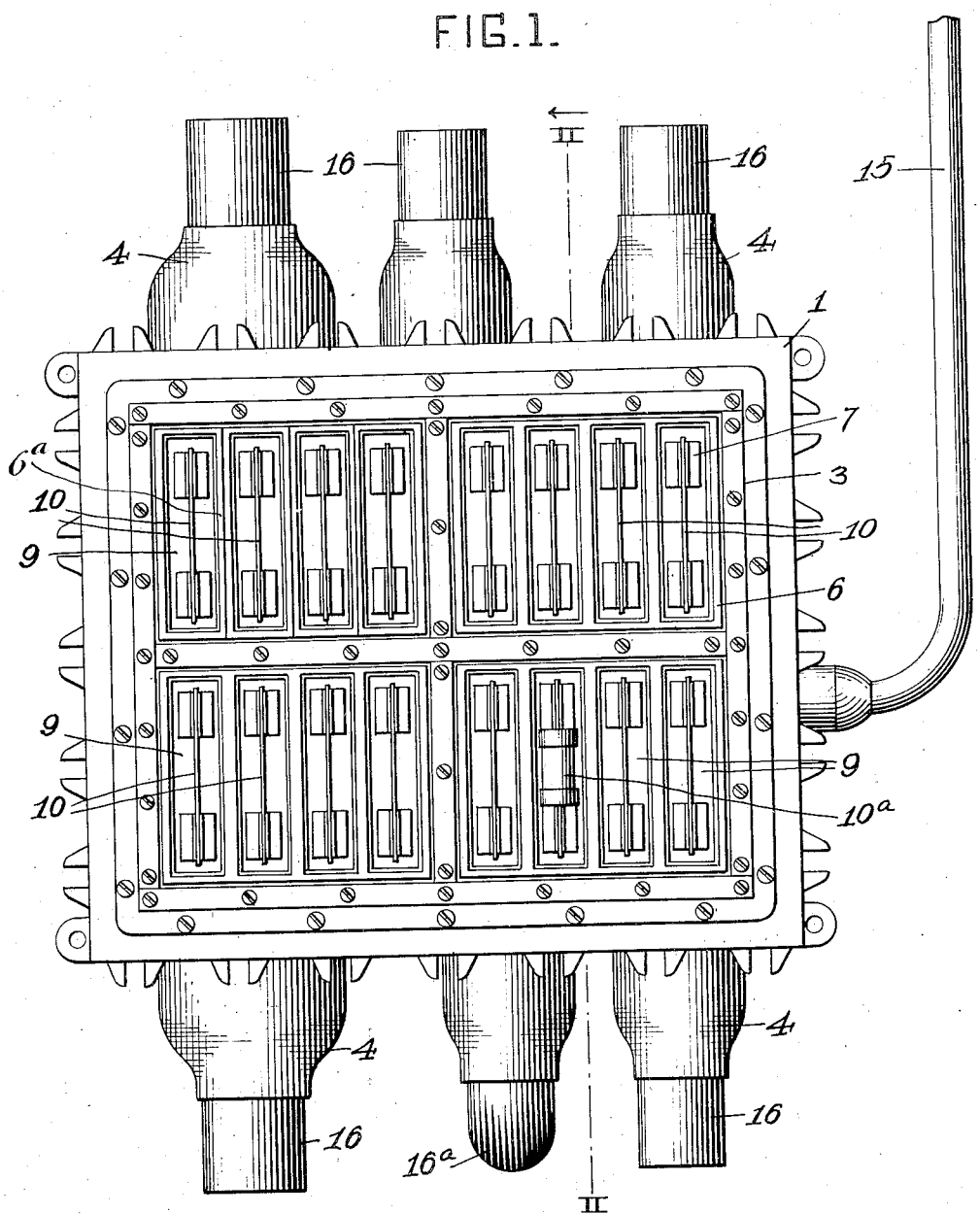
Figure 2:
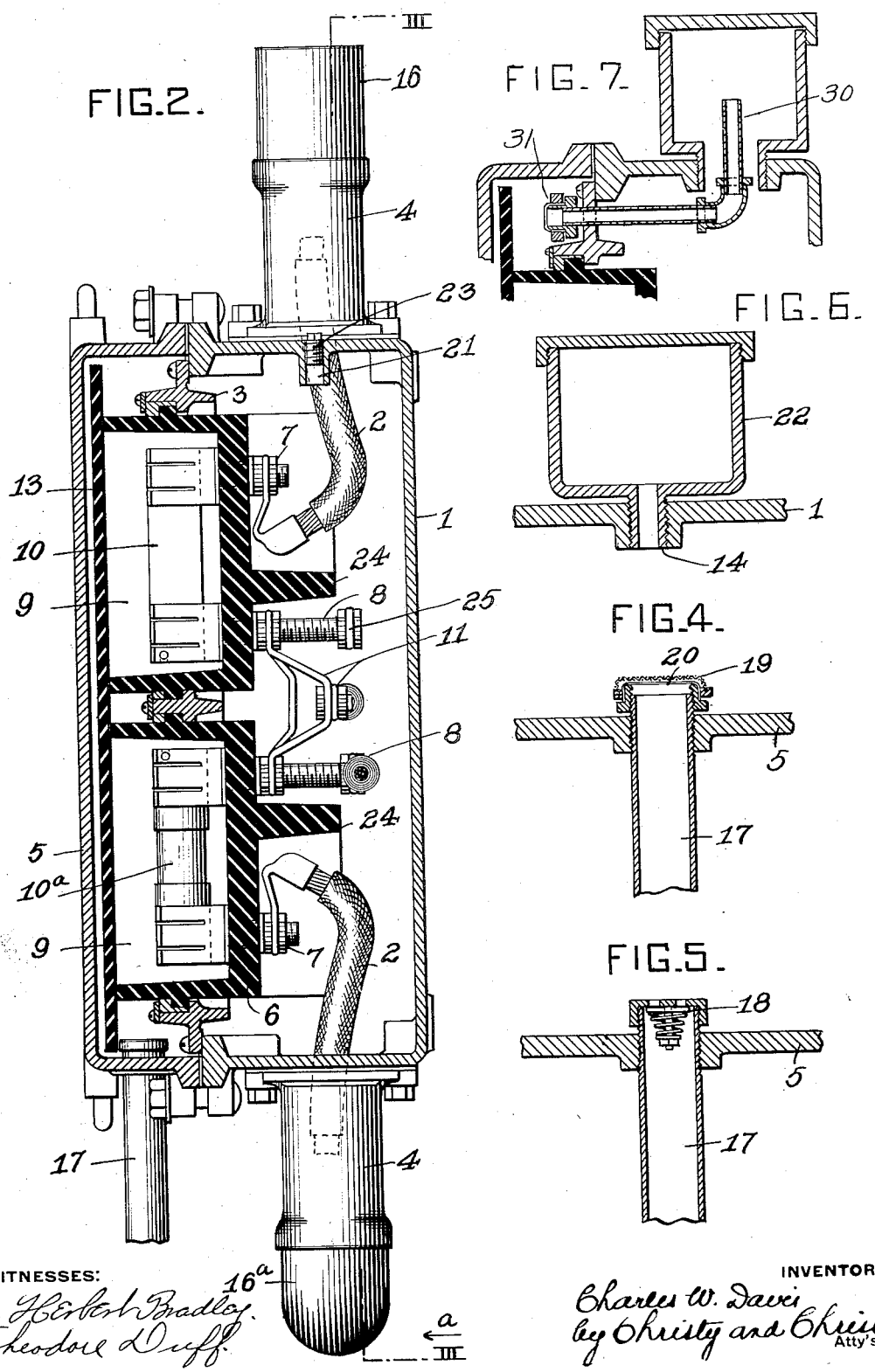
Figure 3:
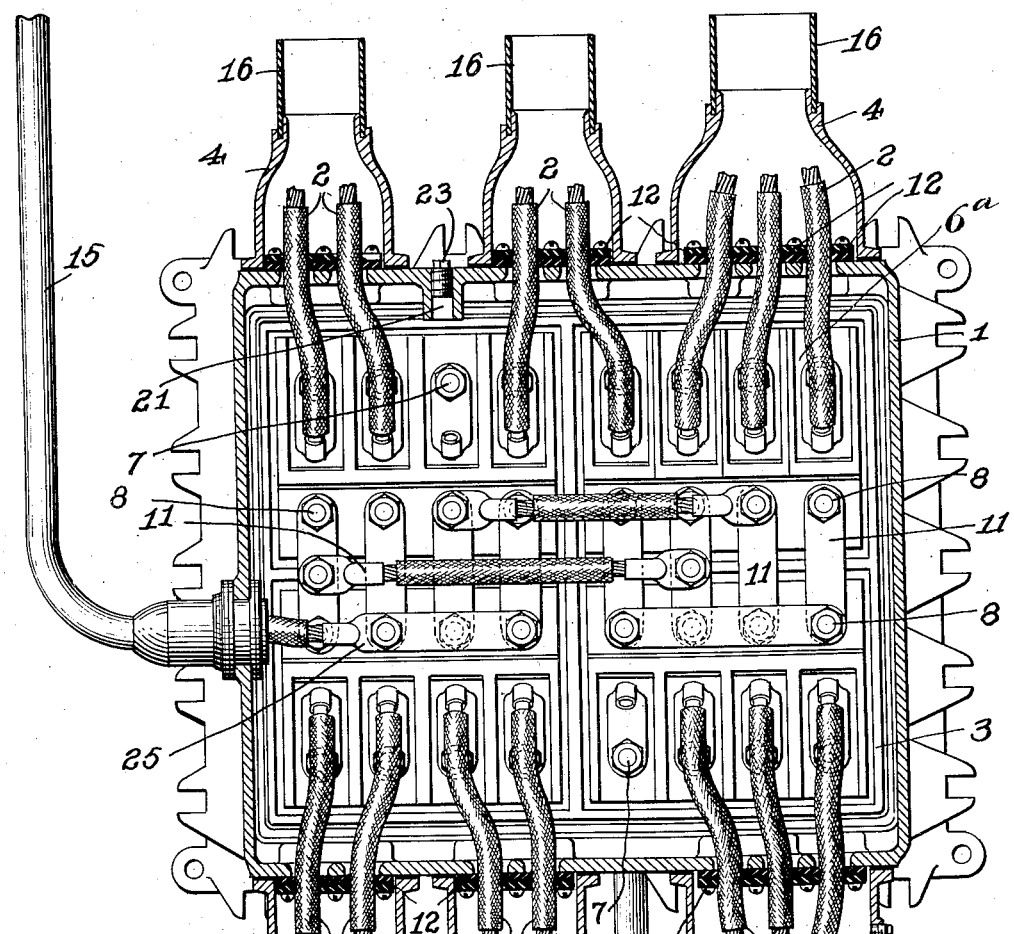
Figure 8:
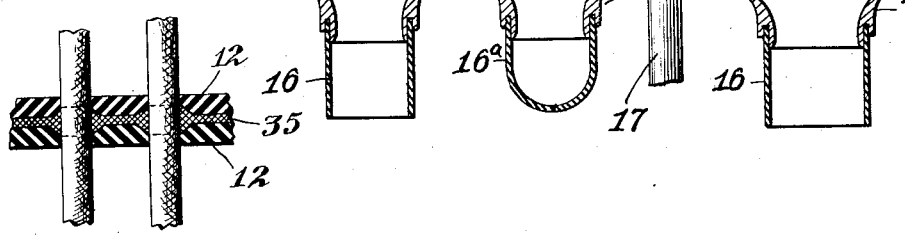

Figure 1 is a plan of the box before the insulating closure and top portion of the casing (both hereinafter described) have been assembled; Fig. 2 is a section taken on the line II—II of Fig. 1; Fig. 3 is a section taken on line III—III of Fig. 2, looking in the direction indicated by the arrows *a;* Figs. 4 and 5 are vertical sections of relief valves; Fig. 6 a vertical section of an expansion chamber; Fig. 7 is a vertical section illustrating a modification in detail; and Fig. 8 is an enlarged view of the packing plates with interposed gasket. Figs. 4–6 illustrative of details are drawn to larger scale than Figs. 1–3.

The same numerals are used throughout to designate the parts which appear in the several figures.

The junction box I have invented is particularly applicable to cables carrying such high-voltage currents as are liable to jump from one conductor to another; and it is also particularly designed for underground cables, where the junction box must be placed in a manhole where working conditions are necessarily limited by lack of space. In meeting these two conditions, I have designed a junction box wherein all the conductors are insulated, either by being surrounded by walls of insulating material or by being immersed in an insulating compound, proper precaution being taken in the latter case to provide room for the expansion of said compound, due to increase in temperature under working conditions. Furthermore, all the parts of the box may be assembled in the shop and packed with said compound, leaving only the hereinafter described flexible leads to be attached to the cable in the manhole. The said attachment or detachment may be made without in any way affecting the integrity of the insulation of the box proper.

The junction box consists of a casing 1 having a removable cover 5, and divided internally and beneath the closure of the cover by a partition, which partition separates the space within the box into separate chambers. This partition is composed, at least through a substantial part of its extent, of insulating material, and through such insulating wall one or more pairs of binding posts extend. The chamber beneath the partition, that is, on the side opposite the removable cover, is the chamber into which the cables lead through suitably arranged orifices, and the leads from the cable conductors are in this chamber connected with the binding posts which extend through the partition. On the opposite side of the partition, that is, the side which is alternately covered and exposed by the application and removal of the cover, the pair or pairs of binding posts are connected electrically by connecting strips, or if desired by fuses.

Referring specifically to the drawings, the partition is shown to consist of a spider 3, which in this case sustains a plurality of cups 6 formed of insulating material, which are open-mouthed toward the removable cover. In the bottom of each cup, and extending through the wall of insulating material which is part of the partition wall, are a pair of binding posts 7, 8. Within the chamber beneath the partition the binding posts 7 are electrically united with leads 2 which extend through orifices in the junction box wall for connection with the conductors of the cables which are applied to the junction box. The binding posts 8 (for in this case there are a series of pairs of binding posts) are inter-connected through bus-bars 11.

To the outer wall of the casing of the junction box, and surrounding each orifice through which the cable conductors gain entrance to the box, are applied one or more supplemental casings in the form of bells 4 upon which the sheaths of entering cables may be secured. The bells are preferably made of two parts, that adjacent the case being of a relatively rigid material, preferably brass, and the other part being of a relatively ductile metal, preferably lead, in the form of a sleeve 16. The bi-metallic bell is preferable, because of the difficulty in forming a wiped-solder joint between the bell and a cable sheath, if the whole structure of the bell be brass.

The chamber beneath the partition into which the cable orifices open is adapted to be filled with an insulating material; this material will preferably be what is commonly termed "insulative-compound" applied hot and fluid, but viscid or solid at normal atmospheric temperature. To effect the closure of the cable orifice around the leads, and so adapt this chamber for receiving and containing the insulating compound when that material is used as a filler, a packing is made in each orifice, the details of which are specifically shown in Figs. 3 and 8 of the drawings. The packing consists of a pair of plates 12, with an interposed gasket 35 (see Fig. 8), having openings through them for the passage of the leads, which plates are adapted to be bolted from the outside over the several orifices, and which, when applied and bolted to place, will effect a compression of the gasket against the surfaces of the lead and make a tight closure of each orifice.

An orifice is provided in the wall of the casing, and opening into the chamber beneath the partition, through which insulating compound may be applied. The drawings show such an orifice closed by screw plug 23. Means are provided for preventing the complete filling with insulating compound of the chamber beneath the partition. Or rather, provision is made that when the chamber is substantially filled, there shall remain either within the walls of the box itself or in a supplemental and connecting chamber, an air space to serve as a cushion; for the coefficient of expansion of insulating compound such as is commonly used is great, and so great that if a junction box chamber be completely filled with compound the expansion which may occur under varying temperature may disrupt the box when in service. My preferred construction in this regard is particularly shown in Figs. 2 and 3, and an alternative construction is illustrated in Fig. 6. My preferred construction consists in providing a filling orifice with an inward extending lip 21 of such length that when the box is placed in the position indicated in Fig. 3 for the purpose of filling, this lip 21 will, as the insulating material is poured in, trap a body of air in the upper part of the casing, which body of air may not be displaced by pouring in more of the fluid compound, and this body of air will serve as a cushion for the purpose I have described. The alternative shown in Fig. 6 does not involve such a depending lip as is illustrated in Figs. 2 and 3, although a slight enlargement or boss is, for structural reasons, desirable at the point where the opening is made; but a closed air chamber 22 is tapped into the orifice. This chamber is removable to allow the filling of the junction box to be effected, and when the filling has been performed, it is applied to afford the desired cushioned chamber. It will be understood that such a chamber as 22 may supplement an air space left above the level of the compound within the main casing.

In Fig. 7 I have shown an arrangement which permits an equalization of pressure between the expansion or cushioning body of air beneath the partition and the air chamber above the partition, such pressure equalization being effected when expansion of the insulating filler compresses the air cushion beyond a certain point. Such an arrangement consists of communication preferably effected through a pipe 30, and such communication being normally interrupted by a closure 31 of any preferred form which under abnormal pressure will open. Preferably the closure is in the form of a frangible septum of moisture-proof material, such as varnished cloth or paraffin paper.

One feature remains to be noted of the arrangement of the parts beneath the partition. Aprons 24 are preferably provided, formed of insulating material, and conveniently made part of the insulating plates or sections 6 of the partition itself, which extending between the binding posts which form the pairs, prevent electrical discharge between them or between approaching conductors.

Referring now to the chamber on the upper side of the partition, that is the side which is closed by the removable cover, the structural features consist in means for preventing electric discharge from the current-carrying members on that side of the partition, to the removable cover; second, where a plurality of pairs of binding posts are present, means for preventing electric discharge from one pair of binding posts to another; and third, a means for guarding from disruption the junction box casing itself, in the event of the explosion of a fuse employed to connect a pair of binding posts.

The means for preventing electrical discharge from the binding posts to the cover, consist of a screen 13, preferably in the form of an asbestos-covered board, which is arranged within the junction box to extend between the adjacent ends of the binding posts and the cover of the junction box. I have hereinabove spoken of the insulating portions of the partition as open-mouthed cups, 6. So far as their function in forming the partition is concerned, their cup-shaped form is not essential, for they are simply plates set in the spider 3, but their cup shape has its function to prevent the discharge of electricity from a binding post of one pair to a binding post of another, and to this end the flaring portions of the cups extend between and screen the pairs of binding posts from one another. As shown in the drawings the several pairs of binding posts may be connected either by connecting strips 10, or by fuses 10ª.

The means employed for protecting against disruption of the casing itself in consequence of the explosion of a fuse, consist of an orifice in the wall of the casing opening from the chamber above the partition and a closure for that orifice which is disruptable under the pressure of explosion such as I have alluded to. In Figs. 4 and 5 are shown alternative forms of closure. The closure of Fig. 4 consists of a septum 20 of proper material, which may be varnished fabric or oiled paper, which is impervious to moisture, but which under the pressure of explosion of a fuse, will burst outwardly and relieve the pressure. The closure shown in Fig. 5 consists of an outwardly opening valve 18, which may be held to its seat by any well known means, for example by spring pressure, and which, yielding under the stress of explosive expansion, opens to relieve the pressure within the chamber. I further provide against the ingress of water through this pressure relief orifice in case a rising of water in a manhole should effect the submergence of the junction box. To this end a tube 17 surrounds the orifice on the outside of the box and projects downwardly to form a chamber within which air is trapped when water rises around the junction box, and the air so trapped guards the orifice from the entrance of water. It will be understood that it is better to form this orifice in that wall of the junction box which when the box is installed is lowermost, in order that this air-trapping tube may be most readily and simply arranged. In the case of the frangible septum illustrated in Fig. 4, the septum may, if desired, be protected against disruption by pressure from without, such as may be occasioned by submergence of the junction box, by a screening 19 lying against the septum 20 and supporting it from the inside.

The adaptability of the box to varying conditions of service is apparent. While I may provide a separate cup for each pair of binding posts (such separate cups 6ª being particularly illustrated in Figs. 1 and 2), and so have each connection separately removable and replaceable, I preferably subdivide each cup by partitions into a plurality of compartments 9 and place a pair of binding posts in each compartment. In other words, I may have a plurality of cups in a single piece. While the spider 3 may support a single cup, it is preferred for complicated systems to provide a number of cups arranged in a double row, and place each pair of binding posts in a position transverse to the line of succession of individual cups. By such arrangement the inner binding posts of opposite pairs are in convenient position for interconnection by bus bars or otherwise, and the outer posts nearer the walls of the box are provided with the flexible leads which pass through the orifices in the walls.

It will be understood that the shape of the junction box, the number of cups, the number of compartments in each cup, the number of cables entering and leaving the box, the number of conductors in each cable, are features which admit of indefinite variation.

The assembling of the parts is effected in this manner. The cup or cups with the binding posts in place are mounted in the spider and the desired connections are made. Within the cups the strips 10 or fuses 10ª are applied, and the opposite ends of the binding posts are either interconnected as by bus-bars 11 or are provided with flexible leads 2. The partition is then brought to position in the casing, and as it is applied the flexible leads 2 are carried through the proper orifices. The partition is then secured in place, the packing is applied in the orifices, and the chamber beneath the partition filled with insulating compound. The cover 5 is then applied, and the box is ready for installation.

It will be observed of the box as thus far described, that the arrangement while simple is economical of space, and that the parts are readily accessible for purposes of installation and repair. It will further be observed that the structure is such that the whole box may be assembled in the shop, and that installation may be effected merely by making ordinary connection between the conductors of the cables and the leads, and by securing the cable sheaths to the bells 4. The drawings show a cable 15 entering the box and connected with a neutral bus bar 25. The sleeve 16 of the bells 4 may be closed, as is particularly illustrated at 16ª, Fig. 3, to protect the end of a lead 2 secured in place; and in such condition the box may be shipped. The closed end of the sleeve will be opened when installation is to be made. It will be understood that not only is the partition removable as a whole, but the individual cups are separately removable, which is a feature of distinct advantage for purposes of repair or introduction of or removal of additional lines to the junction box. When in use any face of the box may be the top, but for convenience of illustration the side uppermost in the drawings is considered the top.

I claim herein as my invention:

1. In a junction box the combination of a casing with a removable lid, a partition seating itself beneath said lid and when the parts are in place dividing the space within the casing into separate chambers, a plurality of cups formed of insulating material contained in said partition and open-mouthed toward said lid, and current-carrying members within said cups, substantially as described.

2. In a junction box the combination of a casing, a partition mounted therein and dividing the space within said casing into a plurality of chambers, said partition consisting of a spider and a plurality of plates of insulating material carrying pairs of binding posts mounted in said spider and severally removable therefrom, substantially as described.

3. In a junction-box for electrical conductors containing an explosive fuse and provided with an orifice in its wall, a disruptable closure for said orifice, the said orifice provided with a water-seal consisting of an open depending tubular extension, substantially as described.

4. In a junction-box for electrical conductors, the combination of a casing, a partition dividing the space within the casing into separate chambers, a body of insulating material within the chamber on one side of said partition, an air chamber in communication with the insulating-material-filled space, an explosive fuse within the chamber on the opposite side of said partition, the wall of the portion of said junction box casing inclosing said fuse-containing chamber being provided with an orifice; a disruptable closure for said orifice, said orifice provided with a tube extending into said air chamber, substantially as described.

5. As an article of manufacture, a junction box having a lid and provided with an orifice in its wall, a body of insulation filling a portion only of said box opposite said lid, an electrical conductor passing fluid-tight through said orifice and through said body of insulation and into the unfilled portion of said box, and a closed supplemental casing inclosing the outer end of said conductor and secured externally to said junction box wall.

6. As an article of manufacture, a junction box having a lid, a partition dividing the space within said box into open and closed chambers, said open chamber being adjacent to said lid and said orifice opening into said inclosed chamber, a body of insulating compound within said closed chamber, an electrical conductor passing fluid-tight through said orifice in the box wall and through said compound and said partition into said open chamber, and a closed supplemental casing inclosing the outer end of said conductor and secured externally to said junction box wall.

7. The combination with a junction box having an orifice in its wall and provided with interconnected electrical conductors and having an electrical conductor extending through said orifice in its wall; of a closed supplemental casing inclosing the outer end of said conductor and secured externally to said junction box casing, the outer closed end of said casing being constructed of soft metal and being convex outwardly.

8. In a junction box, the combination of a casing having a lid, a partition seating itself beneath said lid and dividing the space within said casing into separate chambers, a plurality of insulated compartments formed upon said partition and open-mouthed toward said lid, and a plurality of electrical conductors extending through said partition into each of said compartments.

In testimony whereof, I have hereunto set my hand.

CHARLES W. DAVIS.

Witnesses:
G. G. TRILL,
BAYARD H. CHRISTY.